US010185880B2

(12) United States Patent
Viswanathan et al.

(10) Patent No.: US 10,185,880 B2
(45) Date of Patent: Jan. 22, 2019

(54) METHOD AND APPARATUS FOR AUGMENTING A TRAINING DATA SET

(71) Applicant: HERE GLOBAL B.V., Eindhoven (NL)

(72) Inventors: Anirudh Viswanathan, Berkeley, CA (US); Vishal Jain, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/475,492

(22) Filed: Mar. 31, 2017

(65) Prior Publication Data

US 2018/0285663 A1    Oct. 4, 2018

(51) Int. Cl.
| G06K 9/00 | (2006.01) |
| G06T 3/40 | (2006.01) |
| G06T 3/60 | (2006.01) |
| G06T 7/73 | (2017.01) |
| G06T 11/00 | (2006.01) |

(52) U.S. Cl.
CPC .......... G06K 9/00818 (2013.01); G06T 7/73 (2017.01); *G06T 3/40* (2013.01); *G06T 3/60* (2013.01); *G06T 11/00* (2013.01)

(58) Field of Classification Search
CPC ............... G06K 9/00818; G06T 7/73; G06T 2207/20081; G06T 11/00; G06T 3/00; G06T 3/40; G06T 3/60
See application file for complete search history.

(56) References Cited

U.S. PATENT DOCUMENTS

| 5,953,076 A * | 9/1999 | Astle ...................... G06T 7/246 348/580 |
| 6,801,638 B1 | 10/2004 | Janssen et al. |
| 8,761,435 B2 | 6/2014 | Chen |
| 2016/0104042 A1* | 4/2016 | Romanik .................. G06T 7/33 382/103 |
| 2016/0162750 A1 | 6/2016 | Haselhoff et al. |
| 2017/0061625 A1* | 3/2017 | Estrada ................ G06T 7/0042 |
| 2017/0134794 A1* | 5/2017 | Chenillo ............ H04N 21/4312 |

(Continued)

OTHER PUBLICATIONS

Kul et al. "Traffic Sign Recognition using Scale Invariant Feature Transform and Color Classification." ISCIS '08, 23rd International Symposium on Computer and Information Sciences, Oct. 27, 2008, pp. 1-6.*

(Continued)

*Primary Examiner* — Jon Chang
(74) *Attorney, Agent, or Firm* — Alston & Bird LLP

(57) ABSTRACT

A method, apparatus and computer program product are provided for augmenting a training data set. In a method, a first type of road sign is identified within an image, the orientation and scale of the first type of road sign within the image are estimated and stylistic content associated with the first type of road sign within the image is identified. The method transforms an image of a second, less common type of road sign based upon the orientation, scale and stylistic content of the first type of road sign. The method also creates a synthetic image in which the first type of road sign is replaced by a transformed representation of the second type of road sign and pixels are filled in the synthetic image about the second type of road sign that were previously occluded by the first type of road sign.

20 Claims, 4 Drawing Sheets

(56) References Cited

U.S. PATENT DOCUMENTS

2017/0323452 A1* 11/2017 Chen .................. G06T 7/246

OTHER PUBLICATIONS

Gatys, L.A. et al. "A Neural Algorithm of Artistic Style." [retrieved May 2, 2017]. Retrieved from the Internet: <URL: https://arxiv.org/pdf/1508.06576.pdf>. (dated Sep. 2, 2015). 16 pages.

Rozantsev, Artem et al. "On Rendering Synthetic Images for Training an Object Detector." [Retrieved May 2, 2017]. Retrieved from the Internet: <URL: https://arxiv.org/pdf/1411.7911.pdf>. (dated Nov. 28, 2014). 30 pages.

Ruta, Andrzej. "Video-based Traffic Sign Detection, Tracking and Recognition." [Retrieved May 2, 2017] Retrieved from the Internet: <URL: https://pdfs.semanticscholar.org/9f0a/7b0af1b268ddd9ca4eb8cbbb725956978086.pdf>. (dated 2009). 179 pages.

Szeliski, Richard. "Computer Vision: Algorithms and Applications." [Retrieved May 2, 2017]. Retrieved from the Internet: <URL: http://szeliski.org/Book/drafts/SzeliskiBook_20100903_draft.pdf>. (Dated Sep. 3, 2010), 979 pages.

* cited by examiner

METHOD AND APPARATUS FOR AUGMENTING A TRAINING DATA SET

TECHNICAL FIELD

An example embodiment relates generally to the augmentation of a training data set and, more particularly, to a method, apparatus and computer program product for augmenting a training data set to include additional synthetic images of a road sign that otherwise occurs infrequently.

BACKGROUND

In a variety of applications, images are analyzed to detect and identify specific types of road signs. For example, the perception system of an autonomous vehicle receives a data stream from a camera onboard the vehicle. A sign detection module of the perception system analyzes the images contained within the data stream and identifies those regions within the images that depict road signs. In this regard, not only is a road sign identified in an image, but the particular type of road sign, such as a speed limit sign, a railroad crossing sign, a school crossing sign or the like, is identified. In addition to detecting the road signs within the images, the location of the road signs may be determined. In this regard, the location at which the image is captured and, as such, the location of a road sign identified within the image may be determined in various manners including, for example, by position information associated with the image, such as may be provided by position data from a global positioning system (GPS). A confidence measure may also be associated with each road sign identified from the images based upon the degree of certainty associated with the identification of the particular road sign. Based upon the detection of the road signs, the autonomous vehicle may be controlled in such a manner as to obey the various road sign.

As another example, a mapping platform may also be configured to review a plurality of images of various roadways and to identify road signs that appear within the images. The identification of the road signs by a mapping platform may be performed in order to confirm the location and the identity of the various road signs that have previously been included within the map, thereby increasing the confidence values associated with these road signs that are included within the map. Additionally or alternatively, the mapping platform may be configured to identify road signs within the images that are not included within the existing map and, as such, may supplement the map to include the newly identified road signs, thereby updating the map, for example, in an instance in which new roads signs have been recently installed.

The performance of the sign detection module of a perception system or a mapping platform as well as the confidence measures associated with the road signs that are identified are typically dependent upon the type of machine learning algorithms that are utilized to train the sign detection module to identify road signs and, more particularly, to identify specific types of road signs. In instances in which the sign detection module has been trained on large volumes of data, however, the performance of the sign detection module may be depend not only upon the nature of the machine learning algorithm, but also upon the quality of the training data.

With respect to the training data, a training data set may be obtained by manually annotating all road signs of interest within a plurality of images and then training the sign detection module to recognize the particular types of road signs within the images of the training data set. Even in instances in which the road signs are accurately annotated, the performance of the sign detection module may be less than is desired for some types of road signs, such as road signs that occur relatively infrequently within the images of the training data set. For instance, a stop sign may be frequently included in the images of a training data set since a stop sign may be placed at nearly every road intersection. However, other types of road signs, such as a road sign indicating that there is to be no through traffic, may be relatively uncommon. This class imbalance in the types of road signs that are recognized leads to a relatively large data set skew with one occurrence of a rare type of road sign for every thousand or more occurrences of the more common types of road signs. This imbalance in the presence of different types of road signs within the images of a training data set may cause the sign detection module to overfit to the more common types of road signs and to underfit or to completely miss the types of road signs that are much less common.

In order to address this imbalance, training data sets may be augmented in an effort to include more or a greater percentage of the types of road signs that are otherwise relatively uncommon. Techniques for augmenting a training data set may include either data folding or data augmentation techniques. With respect to a data folding technique for rebalancing the different types of road signs included within the images of a training data set, reference is made to an example in which the images of a training data set include three images of stop signs for every one image of a road sign indicating that there is to be no through traffic. In order to better train the road sign detection module, the images including the three stop signs may be divided into three partitions. For each partition, all of the images of the road sign indicating that there is to be no through traffic may be utilized and a classifier employed by the sign detection module may be trained such that the different types of road signs are balanced within the training data set that has been subjected to data folding. Since a different classifier of the sign detection module is trained for each of the different partitions, the majority vote of the three classifiers may be utilized in this example to determine the type of road sign identified within an image of the training data set.

Unfortunately, the data folding technique does not permit classifier confidence values to be predicted as a result of the reliance upon a majority vote amongst the classifiers. Instead, the individual confidence values can only be interpreted as an ordering of each classifier and do not represent a global confidence value. Moreover, a sign detection module that utilizes a deep network may take over a week to train on a few million images. This training time may increase appreciably as a result of data folding. In this regard, in order to train a plurality of deep networks simultaneously as required by the data folding technique on the rebalanced data set, many weeks may be required, which may cause the data folding technique to be infeasible.

With respect to the data augmentation technique, random color jittering, weak affine transformations and left-right image flipping are applied to the images of the training data set to synthetically increase the size of the training data set. In some instances, a three-fold increase in training data is obtained as a result of training data augmentation. The data augmentation technique generates the same appearance content as in the original data set. In this regard, the pixel level jittering introduces local dissimilarities between images, but the overall content still largely remains the same. Thus, the data augmentation technique is generally equivalent to adding noise to the underlying data distribution in an effort to synthetically prevent overfitting.

BRIEF SUMMARY

A method, apparatus and computer program product are provided for augmenting a training data set in a manner that allows a sign detection module or other computing device to be trained in a manner so as to more reliably and consistently identify various types of road signs with greater degrees of confidence. In this regard, the method, apparatus and computer program product of an example embodiment are configured to augment the training data set in such a manner that different types of road signs including road signs that occur more frequently and less frequently are more consistently detected. In this regard, the method, apparatus and computer program product of an example embodiment create synthetic images that include the less common types of road signs that are added to the training data set, thereby facilitating for consistent training not only for the more common types of road signs, but also the less common types of road signs.

In an example embodiment, a method for augmenting a training data set is provided that includes identifying a first type of road sign within an image. The method also estimates the orientation and scale of the first type of road sign within the image and identifies stylistic content, such as one or more of lighting conditions, weather conditions or surface reflectivity conditions, associated with the first type of road sign within the image. The method also includes transforming an image of a second type of road sign based upon the orientation and scale of the first type of road sign and also based upon the stylistic content associated with the first type of road sign. The first type of road sign occurs more often in a plurality of images than the second type of road sign. The method further includes creating a synthetic image in which the first type of road sign within the image is replaced by a transformed representation of the second type of road sign. In relation to creating the synthetic image, the method includes filling in one or more pixels in the synthetic image about the second type of road sign that were occluded by the first type of road sign within the image, such as by inpainting the one or more pixels adjacent the second type of road sign.

The method of an example embodiment estimates the orientation and scale of the first type of road sign by using homography to estimate the orientation and scale of the first type of road sign relative to a predefined image of the first type of road sign. The first type of road sign within the image and the predefined image of the first type of road sign are each associated with a bounding box. In order to estimate the orientation of the scale of the first type of road sign, the method of an example embodiment also includes using homography to estimate the orientation and scale of the first type of road sign based upon the bounding boxes, such as the corner points of the bounding boxes, associated with the first type of road sign within the image and the predefined image of the first type of road sign. The method of an example embodiment also includes accessing a database including images of road signs including the predefined image of the first type of road sign and the image of the second type of road sign. In an example embodiment, the synthetic image is created by causing the transformed representation of the second type of road sign to be overlaid on the first type of road sign within the image.

In another example embodiment, an apparatus is provided for augmenting a training data set. The apparatus includes at least one processor and at least one memory including computer program code with the at least one memory and the computer program code configured to, with the processor, cause the apparatus to at least identify a first type of road sign within an image, estimate an orientation and scale of the first type of road sign within the image and identify stylistic content, such as one or more of lighting conditions, weather conditions or surface reflectivity conditions, associated with the first type of road sign within the image. The at least one memory and the computer program code are also configured to, with the processor, cause the apparatus of this example embodiment to transform an image of a second type of road sign based upon the orientation and scale of the first type of road sign and also based upon the stylistic content associated with the first type of road sign. The first type of road sign occurs more often in a plurality of images than the second type of road sign. The at least one memory and the computer program code are further configured to, with the processor, cause the apparatus of this example embodiment to create a synthetic image in which the first type of road sign within the image is replaced by a transformed representation of the second type of road sign. In this regard, the synthetic image is created by filling in one or more pixels in the synthetic image about the second type of road sign there were occluded by the first type of road sign within the image, such as by inpainting the one or more pixels adjacent the second type of road sign.

The at least one memory and the computer program code are configured to, with the processor, cause the apparatus to estimate the orientation and scale of the first type of road sign by using homography to estimate the orientation and scale of the first type of road sign relative to a predefined image of the first type of road sign. In an example embodiment, the first type of road sign within the image and the predefined image of the first type of road sign are each associated with a bounding box. In this regard, the at least one memory and the computer program code are configured to, with the processor, cause the apparatus to estimate the orientation of the scale of the first type of road sign by using homography to estimate the orientation and scale of the first type of road sign based upon the bounding boxes, such as the corner points of the bounding boxes, associated with the first type of road sign within the image and the predefined image of the first type of road sign. The at least one memory and the computer program code are configured to, with the processor, cause the apparatus of an example embodiment to create the synthetic image by causing the transformed representation of the second type of road sign to be overlaid on the first type of road sign within the image.

In a further embodiment, a computer program product is provided for augmenting a training data set. The computer program product comprises at least one non-transitory computer-readable storage medium having computer-executable program code portions stored therein with the computer-executable program code portions comprising program code instructions configured to identify first type of road sign within an image, estimate an orientation and scale of the first type of road sign within the image and identify stylistic content, such as one or more of lighting conditions, weather conditions or surface reflectivity conditions, associated with the first type of road sign within the image. The computer-executable program code portions also comprise program code instructions configured to transform an image of the second type of road sign based upon the orientation and scale of the first type of road sign and also based upon the stylistic content associated first type of road sign. The first type of road sign occurs more often in a plurality of images than the second type of road sign. The computer-executable program code portions further comprise program code instructions configured to create a synthetic image in which the first type of road sign within the image is replaced by a transformed representation of the second type of road sign. The synthetic image is created by filling in one or more pixels in the synthetic image about the second type of road sign that were occluded by the first type of road sign within the image, such as by inpainting the one or more pixels adjacent the second type of road sign.

The program code instructions configured to estimate the orientation and scale of the first type of road sign comprise program code instructions configured to use homography to estimate the orientation and scale of the first type of road sign relative to a predefined image of the first type of road sign. In an example embodiment, the first type of road sign within the image and the predefined image of the first type of road sign are each associated with a bounding box. In this regard, the program code instructions configured to estimate the orientation and scale of the first type of road sign further comprise program code instructions configured to use homography to estimate the orientation and scale of the first type of road sign based upon the bounding boxes, such as the corner points of the bounding boxes, associated with the first type of road sign within the image and the predefined image of the first type of road sign. In an example embodiment, the program code instructions configured to create a synthetic image comprise program code instructions configured to cause the transformed representation of the second type of road sign to be overlaid on the first type of road sign within the image.

In yet another example embodiment, an apparatus for augmenting a training data set is provided that includes means for identifying a first type of road sign within an image, means for estimating an orientation and scale of the first type of road sign within the image and means for identifying stylistic content associated with the first type of road sign within the image. The apparatus of this example embodiment also includes means for transforming an image of a second type of road sign based upon the orientation and scale of the first type of road sign and also based upon the stylistic content associated with the first type of road sign. A first type of road sign occurs more often in a plurality of images than the second type of road sign. The apparatus of this example embodiment further includes means for creating a synthetic image in which the first type of road sign within the image is replaced by a transformed representation of the second type of road sign. In this regard, the means for creating the synthetic image comprises means for filling in one or more pixels in the synthetic image about the second type of road sign that were occluded by the first type of road sign within the image.

BRIEF DESCRIPTION OF THE DRAWINGS

Figure 1:
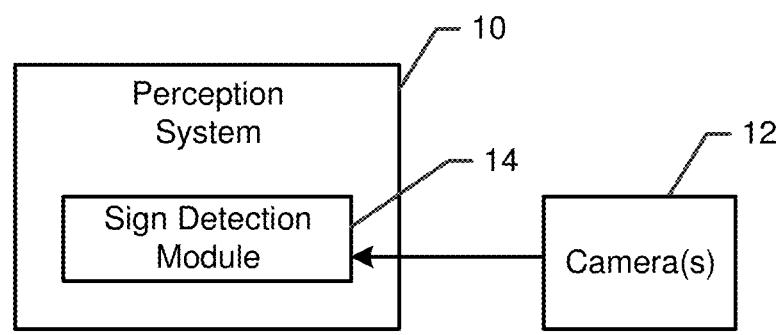
Figure 2:
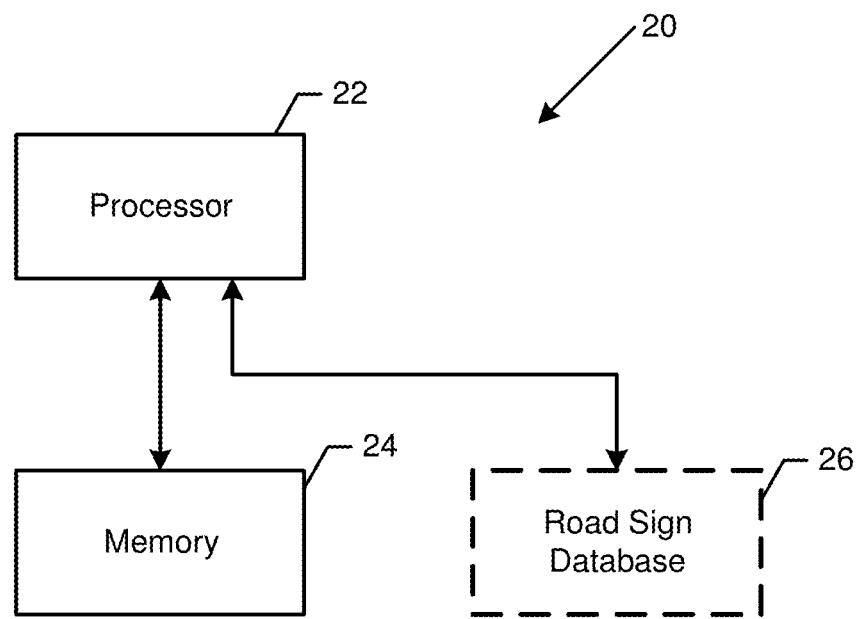
Figure 3:
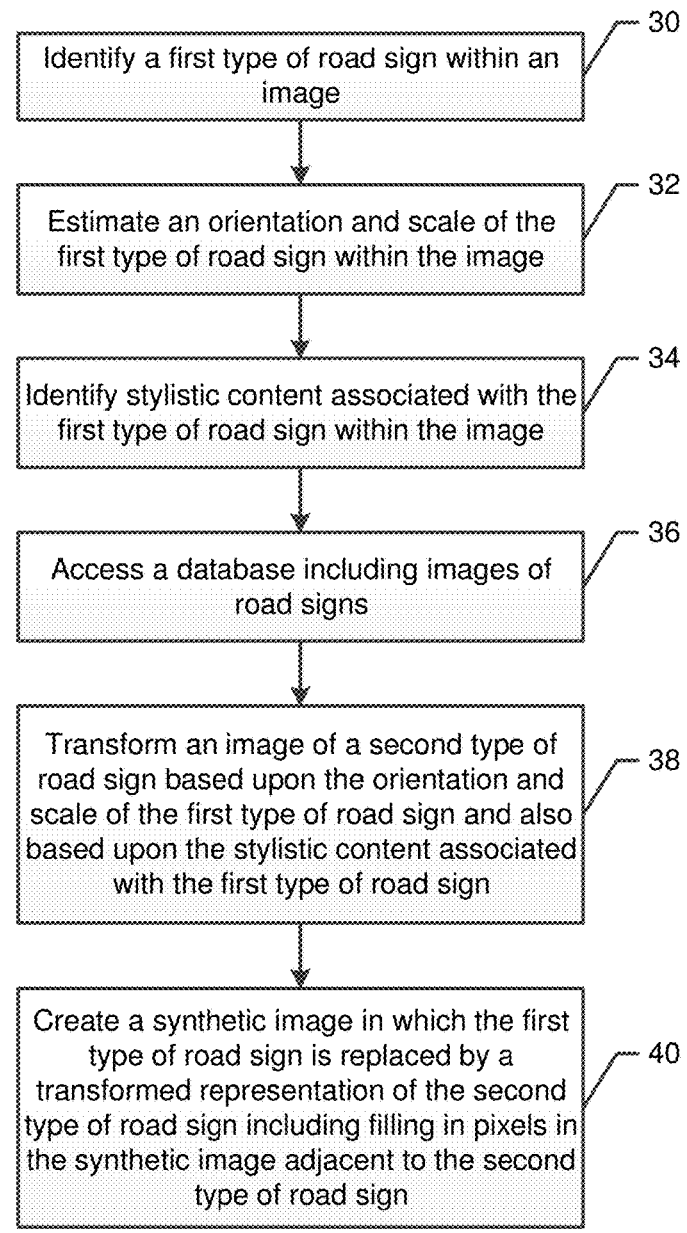
Figure 4:
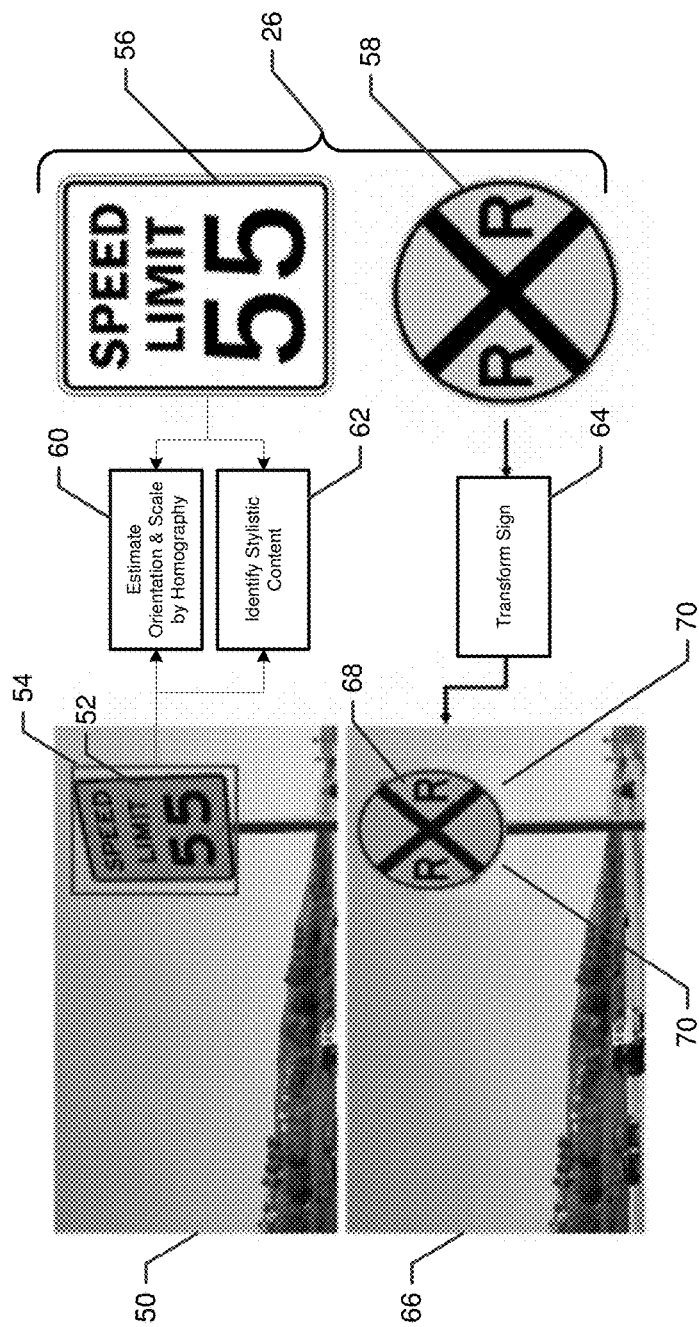

Having thus described certain example embodiments of the present disclosure in general terms, reference will hereinafter be made to the accompanying drawings, which are not necessarily drawn to scale, and wherein:

FIG. 1 is a block diagram of a perception system having a sign detection module that may be trained utilizing a training data set that has been augmented in accordance with an example embodiment of the present disclosure;

FIG. 2 is a block diagram of an apparatus that may be specifically configured to augment a training data set in accordance with an example embodiment of the present disclosure;

FIG. 3 is a flowchart illustrating the operations performed, such as by the apparatus of FIG. 2, in order to augment a training data set in accordance with an example embodiment of the present disclosure; and FIG. 4 is an example representation of the creation of a synthetic image in which a first type of road sign, such as a speed limit sign, has been replaced by a transformed representation of a second type of road sign, such as a railroad crossing sign, in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A method, apparatus and computer program product are provided in accordance with an example embodiment in order to augment a training data set. In this regard, the training data set may include a plurality of images of and along various roadways or other paths of travel (hereinafter generally referenced as a roadway). The images may be captured in various manners, such as by cameras onboard a vehicle driving along the roadway. The training data set may be utilized for various purposes, but in one embodiment it is utilized to train a computing device to identify different types of road signs within the images, such as stop signs, speed limit signs of different posted speeds, railroad crossing signs, school crossing signs, signs indicating that there is to be no through traffic, one way only signs, and many other types of signs. The images of the training data set may each be associated with position data such that the position of any road signs identified within an image is also known. The position data may be collected in various manners including, for example, as position data provided by a GPS that is onboard the same vehicle that is carrying the camera that captures the images. By augmenting the training data set, the computing device that is thereafter trained utilizing the training data set may more reliably identify the different types of road signs and, as such, the confidence values associated with the road signs that are identified by the computing device may be greater, thereby resulting in overall improved performance by the computing device following training.

Various types of computing devices may be trained utilizing the augmented training data set. In an example embodiment, the computing device that is trained may be a perception system 10 as shown in FIG. 1 that is utilized in conjunction with the navigation of an autonomous vehicle. As shown, during transit of an autonomous vehicle, the perception system receives a data stream comprising a plurality of images captured by one or more cameras 12 onboard the autonomous vehicle. The perception system and, in one embodiment, a sign detection module 14 of the perception system analyzes the images of the data stream and identifies road signs within the images. In addition to merely identifying the road signs, the sign detection module typically identifies the particular type of road sign and the location of the road sign, such as based upon the position data associated with the image. The identification of the particular type of road sign by the perception system is associated with a confidence measure which may be increased in instances in which the sign detection module has been trained with the augmented training data set that is created in accordance with an example embodiment of the present disclosure.

Based upon the identification of the particular type of road sign, the autonomous vehicle may be controlled in such a manner as to obey the posted road sign. As a result of the more reliable identification of the road signs and the increased confidence measures associated with the identification of the road signs brought about by the augmentation of the training data set in accordance with an example embodiment of the present disclosure, the resulting navigation of the autonomous vehicle may be improved and may be in greater compliance with the rules of the road as set forth by the various different types of road signs along the roadway.

In another example, the computing device that is trained utilizing the training data set that is augmented in accordance with an example embodiment of the present disclosure is a mapping or navigation system (hereinafter generally referenced as a mapping system) configured to generate and update maps of the roadways. The mapping system may also include a sign detection module for reviewing images taken along the various roadways, such as by cameras onboard vehicles travelling along the roadways. Although the analysis of the images may be performed in a real time or near real time manner as is done by the perception system 10 of an autonomous vehicle, the mapping system of some embodiments may operate in a batch mode so as to review the images following their capture and, in some instances, following storage of the images. The sign detection module of the mapping system reviews the images to identify different types of road signs as well as the locations of the different types of road signs and also determines a confidence measure associated with each different type of road sign identified within the images. By having trained the mapping system, such as the sign detection module of the mapping system, utilizing the training data set that has been augmented in accordance with an example embodiment of the present disclosure, the mapping system, such as the sign detection module of the mapping system, may more reliably identify the different types of road signs and the confidence measures associated therewith may be enhanced, thereby improving the overall performance of the mapping system.

Upon identification of a road sign at a respective location, the mapping system may compare the map of the respective roadway and the road signs included within the map along the respective roadway to the road sign that has been detected within the images to confirm that the road sign is included in the map and is appropriately located therein. In an instance in which the map does not include the road sign that has been identified from the images or in an instance in which the road sign included within the map is differently located than the corresponding road sign identified within the images, the map may be updated to newly include or to more appropriately locate the road sign that has been identified from the images, thereby providing for a more complete and useful map, such as for navigation or other purposes.

As shown in FIG. 2, an apparatus 20 that may be specifically configured to augment a training data set in accordance with an example embodiment of the present disclosure is depicted. The apparatus may be embodied by the perception system 10 of an autonomous vehicle, such as by the sign detection module 14 of the perception system of an autonomous vehicle, or by a mapping system, such as by the sign detection module of a mapping system. However, the apparatus may be embodied by a variety of other types of computing devices, such as a personal computer, a server, a computer workstation or the like, that may be in communication with, but that is separate and discrete from a perception system or a mapping system and that serves to augment the training data set that is, in turn, utilized by the perception system or mapping system for training purposes.

Regardless of the manner in which the apparatus 20 is embodied, the apparatus of an example embodiment includes, is associated with or is otherwise in communication with a processor 22, a memory device 24 and optionally a road sign database 26, as shown in FIG. 2. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

As shown in dashed lines, the apparatus 20 may also optionally include or may otherwise have access to a road sign database 26. As described below, the road sign database includes images of a plurality of different types of road signs. Each predefined type of road sign stored by the road sign database has a predefined orientation and scale and has predefined stylistic content which defines, for example, the lighting conditions, weather conditions or surface reflectivity conditions of the road sign within the image. In some embodiments, the memory device 24 includes the road sign database. In other embodiments, the road sign database is separate from the memory device and is either included within the apparatus or is external to the apparatus, but in communication therewith. In this embodiment, the road sign database may be embodied by a server or other type of memory device.

Referring now to FIG. 3, the operations performed, such as by the apparatus 20 of FIG. 2, are depicted in accordance with an example embodiment. In this regard, a plurality of images are received, such as images on or along a roadway. The images may be captured in various manners, such as by camera carried by a vehicle traveling along a roadway. The images that are received are generally associated with position data, such as may be provided in various manners, such as the position data provided by a GPS that is also onboard the vehicle that carries the camera. Thus, the location of the image and the objects within the image may be determined based upon the position data associated with the image.

As shown in block 30 of FIG. 3, the apparatus 20 includes means, such as the processor 22 or the like, for identifying a first type of road sign within an image. In this regard, the processor may have been trained to identify different types of road signs, such as in the same manner in which the sign detection module 12 of a perception system 10 or mapping system is trained. As described below, the first type of road sign is generally a type of road sign that occurs relatively frequently within the plurality of images. Although the type of road sign that appears relatively frequently within a plurality of images will depend upon the images themselves, typical examples of types of road signs that appear relatively frequently include stop signs and speed limit signs for the more commonly posted speeds, such as 35 miles per hour (mph), 40 mph, 55 mph and the like.

As shown in block 32, the apparatus 20, such as the processor 22, does not merely identify the first type of road sign within an image, but the apparatus also includes means, such as the processor or the like, for estimating the orientation and scale of the first type of road sign that has been identified within the image. In an example embodiment, the apparatus, such as the processor, is configured to use homography to estimate the orientation and scale of the first type of road sign relative to a predefined image of the same, first type of road sign. In this regard, homography provides for local feature-based alignment and defines the difference in appearance of two planar objects, such as road signs, viewed from different points of view, such as a front view and a perspective view. The predefined image of the first type of road sign may be provided in various manners, but, in one embodiment, the road sign database 26 includes the predefined image of the first type of road sign. Thus, the apparatus of this example embodiment also includes means, such as the processor or the like, for accessing a database, such as the road sign database, that includes images of various types of road signs including the predefined image of the first type of road sign.

In an example embodiment, both the first type of road sign that has been identified within the image as well as the predefined image of the first type of road sign, such as provided by the road sign database 26, are associated with a respective bounding box. The bounding box may have various shapes and sizes, but, in some embodiments, is rectangular in shape and is positioned so as to include the entirety of the road sign, typically in a relatively snug manner with one or more portions of the bounding box contacting or being closely spaced from a respective edge of the roadside. By way of example, FIG. 4 includes an image 50 from among a plurality of images captured along a roadway that includes a first type of road sign 52, that is, a speed limit sign posting a speed limit of 55 mph, and a bounding box 54 that has been defined so as to include the road sign. As shown, the bounding box is rectangular and includes the entirety of the road sign, but is sized so as to relatively closely approximate the size of the road sign within the image. The bounding box may have been defined in advance of the analysis of the image by the apparatus 20. Alternatively, the apparatus, such as the processor 22, may be configured to analyze the image, identify the road sign and then define a bounding box thereabout. As also shown in FIG. 4, a database, such as the road sign database, includes predefined images of a plurality of different types of road signs including, for example, a speed limit sign 56 and a railroad crossing sign 58. Although not depicted, each predefined image of a road sign within the database may include a bounding box associated therewith or, alternatively, a bounding box may be defined, such as by the apparatus, e.g., the processor, about the image of the road sign within the database.

In an embodiment in which bounding boxes are associated with the road signs, the apparatus 20 includes means, such as the processor 22 or the like, for using homography to estimate the orientation and scale of the first type of road sign based upon the bounding boxes associated with the first type of road sign within the image and the predefined image of the first type of road sign, such as obtained from the road sign database 26. See block 60 of FIG. 4. For example, the apparatus, such as the processor, may be configured to use homography to estimate the orientation and scale of the first type of road sign based upon corner points of the bounding boxes associated with the first type of road sign within the image and the predefined image of the first type of road sign. For example, the apparatus, such as the processor, may be configured to determine the geometric transformation that must occur in order to convert the orientation and scale of the predefined image of the first type of road sign to the orientation and scale of the first type of road sign within the image. While this geometric transformation may be determined based upon the road signs themselves, the apparatus, such as the processor of an example embodiment, may determine this geometric transformation with reference to the bounding boxes, such as the corner points of the bounding boxes, thereby permitting the orientation and scale of the first type of road sign within the image to be estimated relative to the predefined image for the first type of road sign, such as stored by the road sign database, based upon the geometric transformation required to transform the bounding box about the predefined image of the first type of road sign to align with the bounding box about the first type of road sign within the image.

As shown in block 34 of FIG. 3, the apparatus 20 of this example embodiment also includes means, such as the processor 22 or the like, for identifying the stylistic content associated with the first type of road sign within the image. In this regard, the image may depict the first type of road sign in various conditions which, in turn, affect the appearance of the road sign within the image. Various different types of stylistic content may be identified including, for example, one or more of the lighting conditions, weather conditions and/or surface reflectivity conditions associated with the first type of road sign within the image. Another example of the stylistic content includes scene clutter, such as in the vicinity of the first type of road sign within the image. The stylistic content may be identified in various manners including based upon a comparison to predefined images of road signs that were captured under predefined conditions, such as predefined lighting conditions, predefined weather conditions and/or predefined surface reflectivity conditions. In some embodiments, the apparatus, such as the processor, is configured to define a transfer function that defines the manner in which a predefined image of the first type of road sign, such as stored in the road sign database 26, is to be modified in order to replicate the stylistic content exhibited by the first type of road sign within the image. See block 62 of FIG. 4.

As noted above, the first type of road sign may be a type of road sign that occurs relatively frequently within the plurality of images. Conversely, other types of road signs may occur less frequently within the plurality of images. While the types of road signs that occur less frequently are dependent upon the plurality of images themselves, typical examples of types of road signs that occur less frequently include railroad crossing signs, signs indicating that there is no through traffic permitted or the like. Thus, the apparatus 20 of an example embodiment further include means, such as the processor 22 or the like, for transforming an image of a second type of road sign that occurs less frequently within the plurality of images than the first type of road sign. See block 38 of FIG. 3 and block 64 of FIG. 4. The first and second types of road signs need not have the same shape and size and, instead, may have different shapes as depicted in the example of FIG. 4. The image of the second type of road sign may be obtained in various manners. In one embodiment, the image of the second type of road sign is obtained from a database, such as the road sign database 26 which include predefined images of a plurality of different types of road signs. Thus, the apparatus of this example embodiment includes means, such as the processor or the like, for accessing the database, such as the road sign database that includes images of road signs including the image of the second type of road sign. See bock 36 of FIG. 3.

The apparatus 20, such as the processor 22, is configured to transform the image of the second type of road sign based upon the orientation and the scale of the first type of road sign within the image and also based upon the stylistic content associated with the first type of road sign within the image. Thus, the apparatus, such as the processor, is configured to transform the image of the second type of road sign so as to have the same orientation and scale as that of the first type of road sign identified within the image and to also have the same stylistic content, such as one or more of the same lighting conditions, weather conditions or surface reflectivity condition, as that of the first type of road sign within the image. In this regard, the database, such as the road sign database 26, may include images of different types of road signs including the first and second types of road signs having a predefined orientation, scale and stylistic content. Thus, by determining the orientation, scale and stylistic content of the first type of road sign within the image relative to the predefined image of the first type of road sign within the database, the apparatus, such as the processor, of an example embodiment is configured to transform the image of the second type of road sign from the database utilizing the same orientation and scale and the same stylistic content in order to create a modified image of the second type of road sign that is consistent with the first type of road sign within the image, that is, that has a comparable or the same orientation and scale and a comparable or the same stylistic content.

As shown in block 40 of FIG. 3, the apparatus 20 of an example embodiment also includes means, such as the processor 22 or the like, for creating a synthetic image in which the first type of road sign within the image is replaced by a transformed representation of the second type of road sign. In this regard, the apparatus, such as the processor, of an example embodiment is configured to cause the transformed representation of the second type of road sign to be overlaid on the first type of road sign within the image. By transforming the image of the second type of road sign in accordance with the orientation, scale and stylistic content of the first type of road sign, the transformed representation of the second type of road sign overlays the first type of road sign within the image in such a manner as to completely remove the first type of road sign from view. In this regard, the replacement of the first type of road sign within the image by the transformed representation of the second type of road sign does not merely cause the second type of road sign itself to be overlaid upon the first type of road sign itself, but generally causes the bounding box that is defined about the second type of road sign and which includes the transformed representation of the second type of road sign to be overlaid upon the bounding box about a first type of road sign within the image. As the bounding box about the second type of road sign has been transformed to have the same orientation, scale and stylistic content as the bounding box about the first type of road sign within the image, the bounding box that includes the transformed representation of the second type of road sign is overlaid upon and completely hides from view the first type of road sign as well as adjacent portions of the image that lie within the respective bounding box.

With reference to FIG. 4, an example in which the second type of road sign is a railroad crossing sign is depicted. The image of the railroad crossing sign 58 that is obtained from the road sign database 26 is transformed in accordance with the orientation and scale of the speed limit sign 52 within the image as well as the stylistic content associated with the speed limit sign within the image and a synthetic image 66 is then created in which the railroad crossing sign 68 replaces, such as overlies, the speed limit sign within the image and, more particularly, the bounding box that encompasses the transformed representation of the railroad crossing sign replaces, such as overlies, the bounding box 54 about the speed limit sign in the original image 50.

As shown in the synthetic image 66, pixels designated as 68 in FIG. 4 that are within the bounding box that surround the transformed representation of the second type of road sign but that are exterior of the second type of road sign itself may differ, such as in color, brightness or other parameters, from the corresponding pixels of the original image. In order to smooth the transition from the pixels that remain from the original image (such as those representative of the sky in regions further spaced from the road sign) to those associated with the transformed representation of the second type of road sign that replaces the first type of road sign within the image (such as those designated as 68 in FIG. 4), the apparatus 20 of an example embodiment includes means, such as the processor 22 or the like, for filling in one or more pixels in the synthetic image about the second type of road sign that were previously occluded by the first type of road sign within the initial image, e.g., within bouncing box 54 in image 50 of FIG. 4, such as by lying within the bounding box 54 that extends about the first type of road sign within the image. The pixels may be filled in various manners, but, in one embodiment, the apparatus, such as the processor, is configured to inpaint the one or more pixels adjacent to second type of road sign. Inpainting facilitates the repair of lost or deteriorated portions of an image based upon portions of the image that are not lost or deteriorated. Inpainting may be implemented in some embodiments by a neural network, such as may be embodied by the processor. In this regard, the apparatus, such as the processor, may be configured to inpaint the pixel adjacent the second type of road sign based upon the neighboring pixels from the original image. For example, the apparatus, such as the processor, may inpaint the pixels about the second type of road sign so as to have the same or similar color and other visual parameters as the neighboring pixels from the original image.

By creating synthetic images from the plurality of images from which the first type of road sign was identified, additional images are created that include road signs that otherwise occur less frequently. For example, in an instance in which there are n images that each have k signs, k synthetic images may be generated such that the data set of n images generated $k^n$ training examples. Thus, the training data set as augmented with the addition of the synthetic images may be utilized for training purposes, such as to train the sign detection module 14 of a perception system 10 or a mapping system. As a result of the inclusion of additional images, that is, the synthetic images, including the road signs that otherwise occur less frequently, the sign detection module may be trained in a manner so as to more reliably detect a wider variety of road signs including both those that occur more frequently and those that occur less frequently and to have greater confidence measures associated with the different types of road signs that are identified including those that occur more frequently and less frequently. As a result of the more reliable detection of the wider variety of road signs and the greater confidence measures associated therewith, the perception system, the mapping system and other types of systems that depend upon training utilizing a plurality of images including different types of road signs may be improved and be more trustworthy.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 24 of an apparatus employing an embodiment of the present invention and executed by the processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed is:

1. A method for augmenting a training data set, the method comprising:
    identifying a first type of road sign within an image;
    estimating an orientation and scale of the first type of road sign within the image;
    identifying stylistic content associated with the first type of road sign within the image;
    transforming an image of a second type of road sign based upon the orientation and scale of the first type of road sign and also based upon the stylistic content associated with the first type of road sign, wherein the first type of road sign occurs more often in a plurality of images than the second type of road sign; and
    creating a synthetic image in which the first type of road sign within the image is replaced by a transformed representation of the second type of road sign, wherein creating the synthetic image comprises filling in one or more pixels in the synthetic image about the second type of road sign that were occluded by the first type of road sign within the image.

2. A method according to claim 1 wherein estimating an orientation and scale of the first type of road sign comprises using homography to estimate the orientation and scale of the first type of road sign relative to a predefined image of the first type of road sign.

3. A method according to claim 2 wherein the first type of road sign within the image and the predefined image of the first type of road sign are each associated with a bounding box, and wherein estimating an orientation and scale of the first type of road sign further comprises using homography to estimate the orientation and scale of the first type of road sign based upon the bounding boxes associated with the first type of road sign within the image and the predefined image of the first type of road sign.

4. A method according to claim 3 wherein using homography to estimate the orientation and scale of the first type of road sign comprises using homography to estimate the orientation and scale of the first type of road sign based upon corner points of the bounding boxes associated with the first type of road sign within the image and the predefined image of the first type of road sign.

5. A method according to claim 2 further comprising accessing a database including images of road signs including the predefined image of the first type of road sign and the image of the second type of road sign.

6. A method according to claim 1 wherein creating a synthetic image comprises causing the transformed representation of the second type of road sign to be overlaid on the first type of road sign within the image.

7. A method according to claim 1 wherein filling in the one or more pixels comprises inpainting the one or more pixels adjacent the second type of road sign.

8. A method according to claim 1 wherein the stylistic content comprises one or more of lighting conditions, weather conditions or surface reflectivity conditions.

9. An apparatus for augmenting a training data set, the apparatus comprising at least one processor and at least one memory including computer program code, the at least one memory and computer program code configured to, with the processor, cause the apparatus to at least:
    identify a first type of road sign within an image;
    estimate an orientation and scale of the first type of road sign within the image;
    identify stylistic content associated with the first type of road sign within the image;
    transform an image of a second type of road sign based upon the orientation and scale of the first type of road sign and also based upon the stylistic content associated with the first type of road sign, wherein the first type of road sign occurs more often in a plurality of images than the second type of road sign; and
    create a synthetic image in which the first type of road sign within the image is replaced by a transformed representation of the second type of road sign, wherein the synthetic image is created by filling in one or more pixels in the synthetic image about the second type of road sign that were occluded by the first type of road sign within the image.

10. An apparatus according to claim 9 wherein the at least one memory and computer program code are configured to, with the processor, cause the apparatus to estimate an orientation and scale of the first type of road sign by using homography to estimate the orientation and scale of the first type of road sign relative to a predefined image of the first type of road sign.

11. An apparatus according to claim 10 wherein the first type of road sign within the image and the predefined image of the first type of road sign are each associated with a bounding box, and wherein the at least one memory and computer program code are configured to, with the processor, cause the apparatus to estimate an orientation and scale of the first type of road sign by using homography to estimate the orientation and scale of the first type of road sign based upon the bounding boxes associated with the first type of road sign within the image and the predefined image of the first type of road sign.

12. An apparatus according to claim 11 wherein the at least one memory and computer program code are configured to, with the processor, cause the apparatus to use homography to estimate the orientation and scale of the first type of road sign by using homography to estimate the orientation and scale of the first type of road sign based upon corner points of the bounding boxes associated with the first type of road sign within the image and the predefined image of the first type of road sign.

13. An apparatus according to claim 9 wherein the at least one memory and computer program code are configured to, with the processor, cause the apparatus to create a synthetic image by causing the transformed representation of the second type of road sign to be overlaid on the first type of road sign within the image.

14. An apparatus according to claim 9 wherein the at least one memory and computer program code are configured to, with the processor, cause the apparatus to fill in the one or more pixels by inpainting the one or more pixels adjacent the second type of road sign.

15. An apparatus according to claim 9 wherein the stylistic content comprises one or more of lighting conditions, weather conditions or surface reflectivity conditions.

16. A computer program product for augmenting a training data set, the computer program product comprising at least one non-transitory computer-readable storage medium having computer-executable program code portions stored therein, the computer-executable program code portions comprising program code instructions configured to:
    identify a first type of road sign within an image;
    estimate an orientation and scale of the first type of road sign within the image;
    identify stylistic content associated with the first type of road sign within the image;

transform an image of a second type of road sign based upon the orientation and scale of the first type of road sign and also based upon the stylistic content associated with the first type of road sign, wherein the first type of road sign occurs more often in a plurality of images than the second type of road sign; and create a synthetic image in which the first type of road sign within the image is replaced by a transformed representation of the second type of road sign, wherein the synthetic image is created by filling in one or more pixels in the synthetic image about the second type of road sign that were occluded by the first type of road sign within the image.

17. A computer program product according to claim 16 wherein the program code instructions configured to estimate an orientation and scale of the first type of road sign comprise program code instructions configured to use homography to estimate the orientation and scale of the first type of road sign relative to a predefined image of the first type of road sign.

18. A computer program product according to claim 17 wherein the first type of road sign within the image and the predefined image of the first type of road sign are each associated with a bounding box, and wherein the program code instructions configured to estimate an orientation and scale of the first type of road sign further comprise program code instructions configured to use homography to estimate the orientation and scale of the first type of road sign based upon the bounding boxes associated with the first type of road sign within the image and the predefined image of the first type of road sign.

19. A computer program product according to claim 18 wherein the program code instructions configured to use homography to estimate the orientation and scale of the first type of road sign comprise program code instructions configured to use homography to estimate the orientation and scale of the first type of road sign based upon corner points of the bounding boxes associated with the first type of road sign within the image and the predefined image of the first type of road sign.

20. A computer program product according to claim 16 wherein the program code instructions configured to create a synthetic image comprise program code instructions configured to cause the transformed representation of the second type of road sign to be overlaid on the first type of road sign within the image, and wherein program code instructions configured to fill in the one or more pixels comprise program code instructions configured to inpaint the one or more pixels adjacent the second type of road sign.

* * * * *